(12) United States Patent
Stanich et al.

(10) Patent No.: US 10,757,270 B2
(45) Date of Patent: Aug. 25, 2020

(54) INK ESTIMATION MECHANISM

(71) Applicant: Ricoh Company, Ltd., Tokyo (JP)

(72) Inventors: Mikel John Stanich, Frederick, CO (US); Vincent William Ferreri, Frederick, CO (US); John Thomas Varga, Longmont, CO (US); Nikita Gurudath, Boulder, CO (US); Larry M. Ernst, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 360 days.

(21) Appl. No.: 15/903,455

(22) Filed: Feb. 23, 2018

(65) Prior Publication Data

US 2019/0268482 A1  Aug. 29, 2019

(51) Int. Cl.
H04N 1/00 (2006.01)
H04N 1/405 (2006.01)
H04N 1/60 (2006.01)
G06F 3/12 (2006.01)

(52) U.S. Cl.
CPC ......... *H04N 1/00068* (2013.01); *G06F 3/122* (2013.01); *G06F 3/1219* (2013.01); *G06F 3/1256* (2013.01); *G06F 3/1285* (2013.01); *H04N 1/00005* (2013.01); *H04N 1/405* (2013.01); *H04N 1/605* (2013.01); *G06F 2206/1504* (2013.01)

(58) Field of Classification Search
None
See application file for complete search history.

(56) References Cited

U.S. PATENT DOCUMENTS

| | | | |
|---|---|---|---|
| 5,278,411 A | 1/1994 | Popil et al. | |
| 5,349,377 A | 9/1994 | Gilliland et al. | |
| 5,937,225 A | 8/1999 | Samuels | |
| 8,289,572 B2 | 10/2012 | Ernst et al. | |
| 8,712,925 B2 | 4/2014 | Clark et al. | |
| 8,734,034 B2 | 5/2014 | Morovic et al. | |
| 8,807,695 B1 | 8/2014 | Mantell et al. | |
| 9,661,154 B1 | 5/2017 | Stanich et al. | |
| 2007/0236741 A1* | 10/2007 | Tai | G09G 5/02 358/3.12 |
| 2008/0111842 A1* | 5/2008 | Hall | B41J 2/17566 347/7 |

(Continued)

FOREIGN PATENT DOCUMENTS

| | | |
|---|---|---|
| JP | 2004146914 A | 5/2004 |
| JP | 2011040968 A | 2/2011 |
| JP | 5836343 | 11/2015 |

OTHER PUBLICATIONS

European Search Report for EP Application No. 19157724.6, dated Jul. 19, 2019, 8 pages.

*Primary Examiner* — Jiangeng Sun
(74) *Attorney, Agent, or Firm* — Jaffery Watson Mendonsa & Hamilton LLP

(57) ABSTRACT

A system is disclosed. The system at least one physical memory device to store ink estimation logic and one or more processors coupled with the at least one physical memory device, to execute the ink estimation logic to receive a histogram for each of a plurality of color planes, receive one or more printer system settings and generate estimated ink usage data for each of the plurality of color planes based on the histograms and the one or more printer system settings.

21 Claims, 6 Drawing Sheets

(56) References Cited

U.S. PATENT DOCUMENTS

2011/0141525 A1\* 6/2011 Ng .................... H04N 1/40087
358/3.06
2013/0101328 A1\* 4/2013 Morovic ............ H04N 1/33315
400/76
2016/0360072 A1 12/2016 Inamura et al.

\* cited by examiner

INK ESTIMATION MECHANISM

FIELD OF THE INVENTION

The invention relates to the field of printing systems, and in particular, to performing ink usage estimation for a printing system.

BACKGROUND

In commercial and transactional printers, it is common to estimate ink usage to determine one of the major components of the cost to print a job. Conventional ink estimation methods involve having to first perform a rasterization (or RIP) of the print job to produce a contone image, which is subsequently halftoned with the same halftone producing algorithms and settings to be employed by the targeted printer. The result is a bitmap from the halftoning operation that describes the resulting drop size for each pixel. The bitmap encodes the different drop sizes using a unique symbol for each different drop size (e.g., level zero for no drop, one for small, two for medium and three for large).

In an actual printer this bitmap data would be the input to the drivers of ink jet printheads. Hence the data used in an actual printer is the same as the data used to estimate a print job. Since the drop sizes for an ink jet are known, the amount of ink required to print the job for each color may be calculated as the sum of ink for each drop size, page and color.

However, the above-described ink estimation process is computationally intensive. Methods to speed up the process involve estimating the ink for a down sampled image and multiplying the result by the down sampling factor. For example, down sampling the contone image data by a factor of two in both directions results in a bitmap having one quarter of the pels of the original. An estimate using the sum of the ink drops, based on the downsampled image must be scaled by a factor of four to obtain an estimate for the ink usage of the original contone image. Yet this process is inefficient since the down sampling factor can only be made so large (e.g., normally 2 or 4 depending on a RIP resolution) before the bitmap resolution/quality is so low/degraded that the estimate becomes too erroneous.

On modern printers there are a variety of settings in both the Digital Front End (DFE) and in the actual print engine that can be independently controlled or modified. Generally, modifying any one of these settings can impact the resultant rasterization (RIP) and subsequent halftone. Thus, any slight change in a printer configuration would necessitate a recalculation of any estimate that the user may wish to be reflective of the changed settings. This can lead to an excessive amount of time and resources being used for estimation when something as simple as, for example, the print speed or resolution changes.

Accordingly, an improved mechanism to perform ink estimation is desired.

SUMMARY

In one embodiment, a method is disclosed. The method includes receiving a histogram for each of a plurality of color planes based on corresponding contone images, receive one or more printer system settings and generate estimated ink usage data for each of the plurality of color planes based on the histograms and the one or more printer system settings.

BRIEF DESCRIPTION OF THE DRAWINGS

A better understanding of the present invention can be obtained from the following detailed description in conjunction with the following drawings, in which.

DETAILED DESCRIPTION

A mechanism to perform ink estimation for a printing system is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

Figure 1:
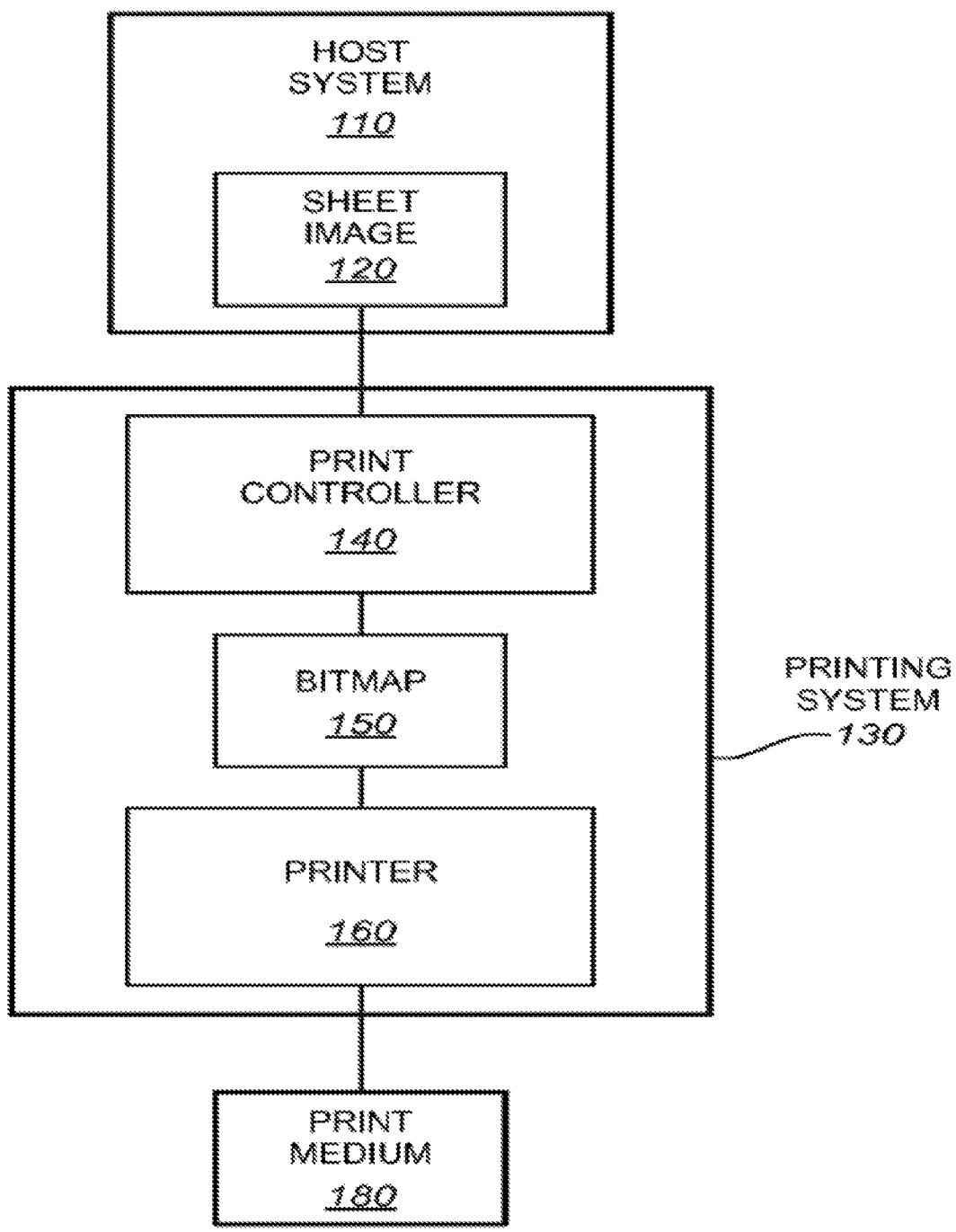
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 (e.g., paper) via a printer 160. The resulting print medium 180 may be printed in color and/or in any of a number of gray shades, including black and white (e.g., Cyan, Magenta, Yellow, and blacK, (CMYK)). The host system 110 may include any computing device, such as a personal computer, a server, cloud infrastructure, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for printing to the print medium 180 via the printer 160. The printing system 130 may be a high-speed printer operable to print relatively high volumes (e.g., greater than 100 pages per minute). The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, marking material, coatings, etc.) based on the sheet image 120. Print controller 140 and printer 160 may be both implemented in the same printing system 130 or implemented separately and coupled together. In another embodiment, print controller 140 may be implemented in host system 110 and coupled to printer 160.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities.

Figure 2A:
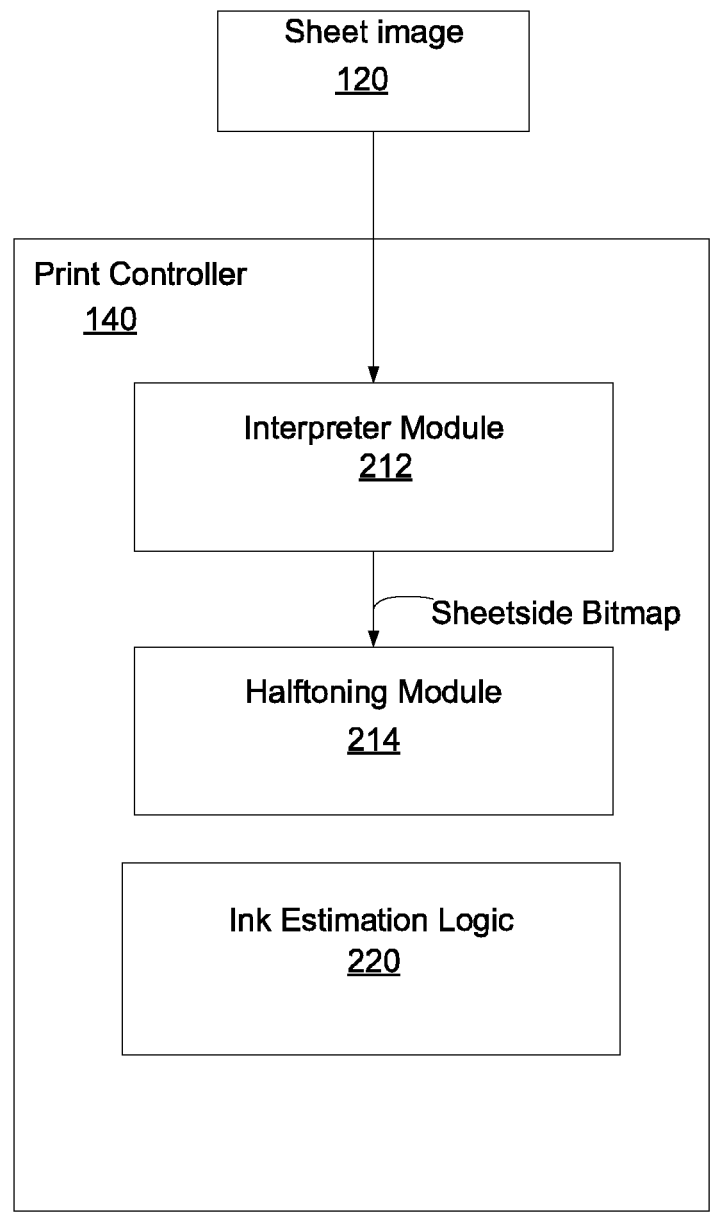
FIGS. 2A&2B are block diagrams illustrating embodiment of a print controller.
Figure 2B:
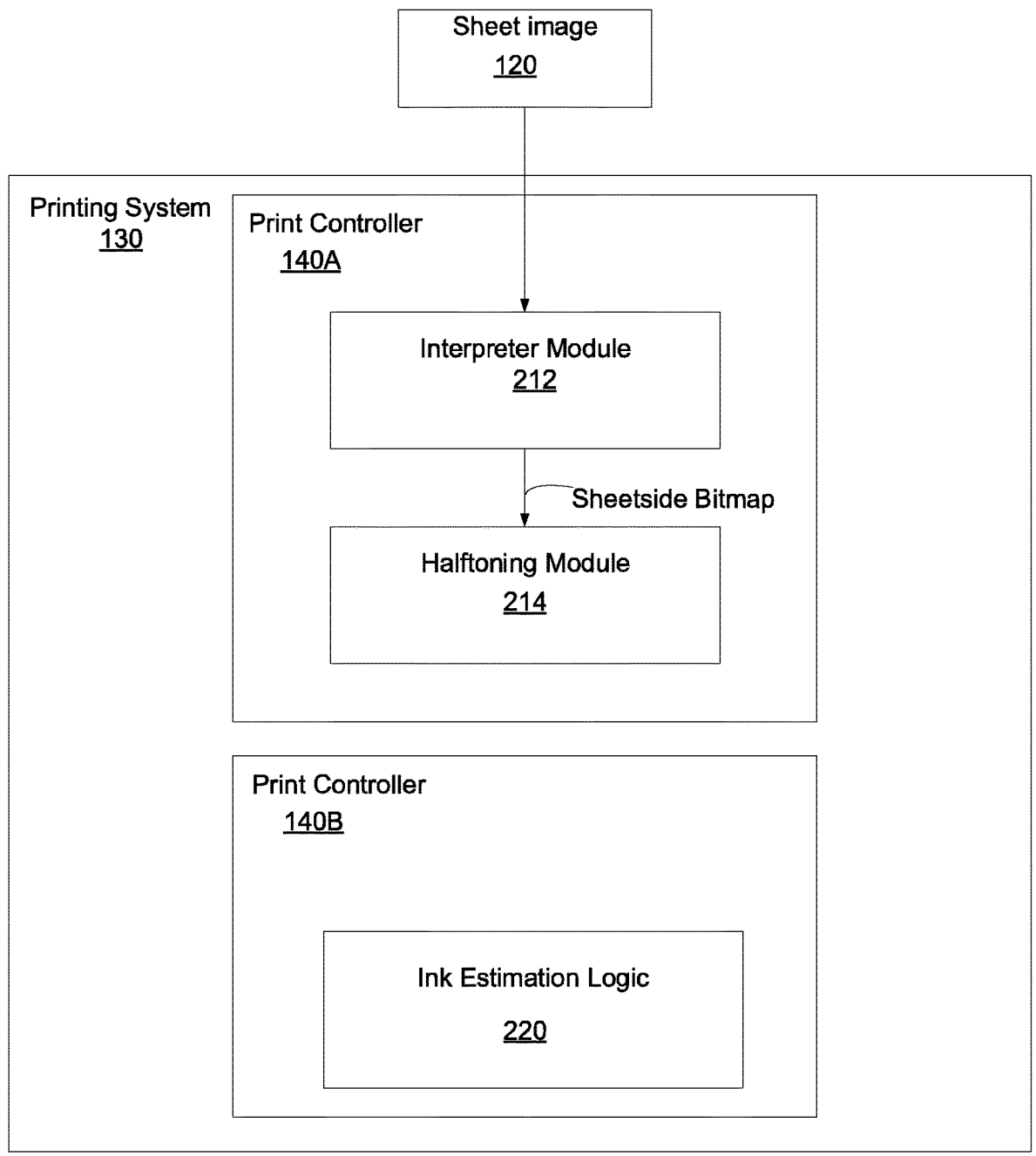

FIGS. 2A&2B illustrate embodiments implementing print controllers 140. FIG. 2A illustrates a print controller 140 (e.g., DFE or digital front end), in its generalized form, including interpreter module 212, halftoning module 214 and ink estimation logic 220, while FIG. 2B illustrates an embodiment having print controllers 140A&140B. In this embodiment, print controller 140A includes interpreter module 212 and halftoning module 214, and print controller 140B includes ink estimation logic 220. Print controllers 140A and 140B may be implemented in the same printing system 130 as shown or may be implemented separately.

Interpreter module 212 is operable to interpret, render, rasterize, or otherwise convert images (e.g., raw sheetside images such as sheet image 120) of a print job into sheetside bitmaps. The sheetside bitmaps generated by interpreter module 212 are each a 2-dimensional array of pixels representing an image of the print job (e.g., a Continuous Tone Image (CTI)), also referred to as full sheetside bitmaps. The 2-dimensional pixel arrays are considered "full" sheetside bitmaps because the bitmaps include the entire set of pixels for the image.

Interpreter module 212 is operable to interpret or render multiple raw sheetsides concurrently so that the rate of rendering substantially matches the rate of imaging of production print engines. In one embodiment, the rate of rendering does not apply to stand alone ink estimation components since it is not actually driving a printer. In such an embodiment, the only requirement is producing an estimate in a reasonable amount of time. Halftoning module 214 is operable to represent the sheetside bitmaps as halftone patterns of ink. For example, halftoning module 214 may convert the pixels to halftone patterns of CMYK ink for application to the paper.

Ink estimation logic 220 is implemented to provide an estimation of ink that is to be used to produce a print job. In such an embodiment, ink estimation logic 220 uses histograms generated for each color plane (e.g., CMYK) to estimate the print job ink usage. Although shown as being implemented in print controller 140, other embodiments may feature ink estimation logic 220 being implemented in any type of computing devices, such as host system 110.

Figure 3:
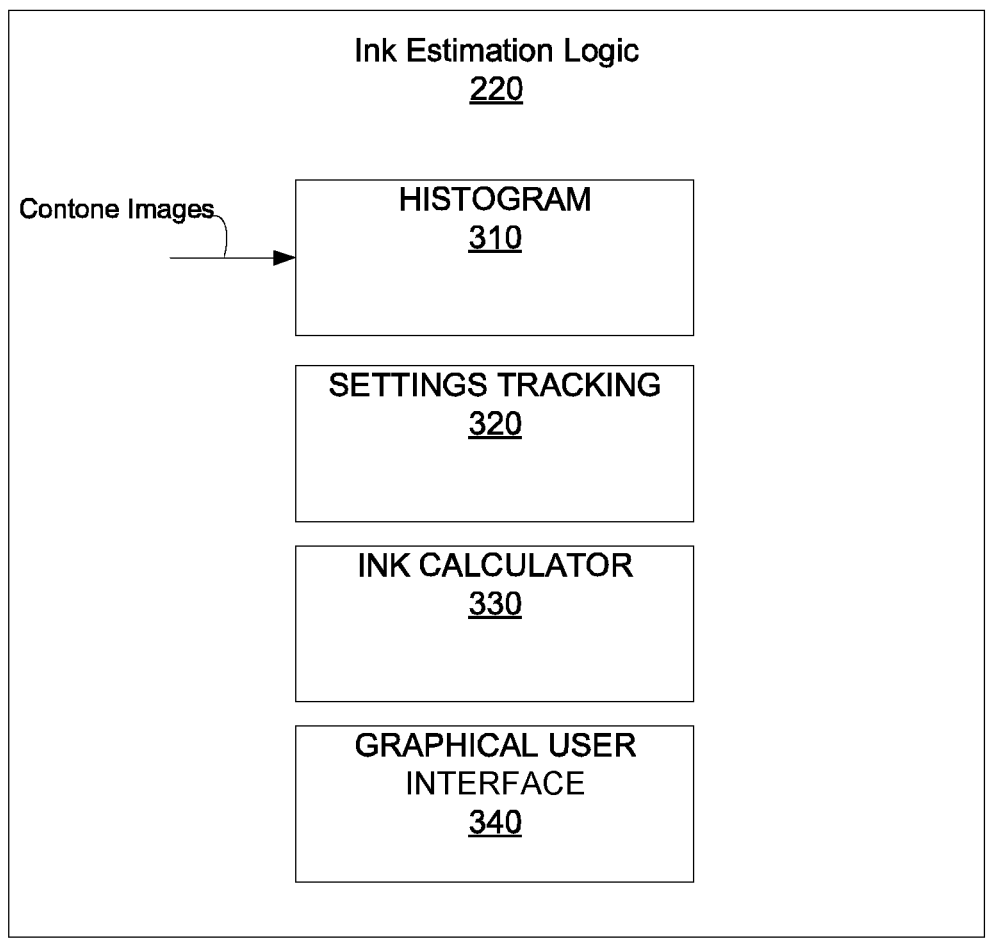
FIG. 3 illustrates one embodiment of ink estimation logic.

FIG. 3 illustrates one embodiment of an ink estimation logic 220, including histogram engine 310, settings tracking module 320, ink calculator logic 330 and graphical user interface (GUI) 340. Histogram engine 310 generates a histogram based on the contone images for each color plane implemented to print a print job without using halftone data. A histogram is a distribution of a number of pixels for every gray level for each color plane over the total print job.

In one embodiment, histogram engine 310 receives contone images corresponding to each color plane of a print job that is to be printed and generates a histogram for each color plane by counting the digital count value for each pel over a total range of allowable digital count values. For a CMYK contone image, the total number of gray levels per color plane=2n, where n=bit depth. Accordingly, four histograms are generated to define all possible colors for a print job in the CMYK color space.

In other embodiments, more colorants may be used (e.g., Magnetic Ink Character Recognition (MICR), Protector, etc.) and those planes may be processed/estimated likewise. In a further embodiment, histograms may show the distribution with bucket sizes having multiple gray levels in each bucket to increase performance with a small decrease in accuracy.

Settings tracking module 320 acquires and stores print job settings and printer system settings that are used in conjunction with the histograms to perform ink estimation. In one embodiment, the print job settings and printer system settings are received via a GUI 340 included for ink estimation module 220. However other embodiments may comprise settings tracking module 320 receiving the print job settings information via a job ticket submitted with the print job and/or components of print controller 140.

In one embodiment, print job settings include information, such as scaling, n-up or other imposition, print quality/resolution, number copies, simplex/duplex. In a further embodiment, one or more of these print job settings may be included in a print job settings group (e.g., a job ticket). Moreover, many of the print job settings may already be accounted for in sheetmaps, such as imposition, resolution and number of copies. Printer system settings may include information for printer 160, such as an ink deposition curve, print resolution, flushing type, post-processing marks, undercoat/overcoat type, ink selection, density mode, print speed or the printer type/model. One or more of the printer system settings may also be included in a printer system settings group (e.g., a printer snapshot or printer profile). An ink deposition curve or table is an offline measurement of a vector of an amount of ink in a pixel (or per area) deposited for different gray levels; where more ink is provided as the gray level increases and no ink is applied for white. Ink deposition curves may be specific to printer system settings such as print engine type and ink type. Ink deposition curves may also be automatically selected based on the printer system settings.

Ink calculator 330 computes an estimated ink usage based on the color histogram, print job settings and/or print system settings. According to one embodiment, ink calculator 330 computes a total volume of ink as a dot product of the histogram and the ink deposition curve on a per pixel and per color plane basis, such that for each color plane:

$$Volume_{estimate} = \sum_{i=0}^{2^{bitDepth}-1} Histogram_i \cdot InkDeposition_i$$

$$= \overrightarrow{Histogram} \circ \overrightarrow{InkDeposition}$$

In another embodiment, ink calculator 330 may adjust ink usage for each color plane based on print job settings. For example, an estimated ink usage for a single copy of a print job may be adjusted to account for multiple copies of the job by multiplying the estimated ink usage of the print job by the number of copies of the print job.

Thus, ink calculator 330 computes estimated ink usage for each color plane for a print job. This volume estimate determines ink that is related to the histogram generated from the contone image data. This may not account for all of the sources of ink usage such as when the printer engine adds flushing patterns or ejects ink for maintenance purposes. To account for additional ink usage that is not accounted for by the histogram, the initial estimated volume is adjusted to obtain a new estimated volume based on printer system settings (e.g., flushing type, post-processing marks, or printhead maintenance type) or print job settings that cause ink usage not accounted for in the histograms. This may take the form of the ink estimation logic 220 calculating additional volumes of ink per linear displacement of the web or per page based on the print job and the corresponding printer system settings or print job settings.

Likewise, ink calculator 330 may estimate other ink usage quantities from a dot product with the histograms. Most notably, page coverage data (the average amount of the page covered by ink) can be estimated from this method. Here, there are various options available, including: 1) a measure of all non-zero pels, or 2) a weighted measure of the pels based on their relative darkness.

Figure 4:
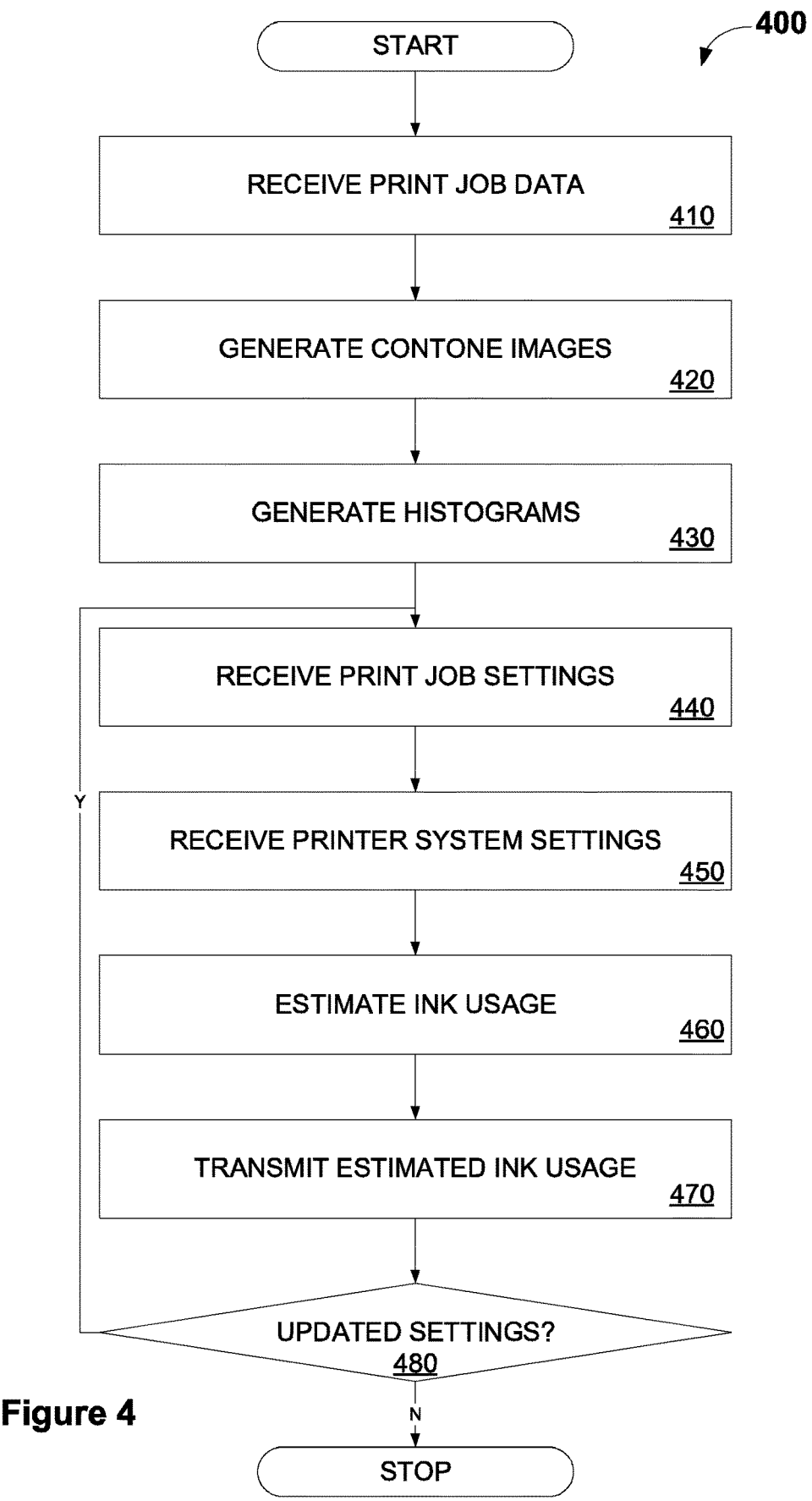
FIG. 4 is a flow diagram illustrating one embodiment for performing an ink estimation process.

FIG. 4 is a flow diagram illustrating one embodiment of a process 400 for performing ink estimation. Process 400 may be performed by processing logic that may comprise hardware (e.g., circuitry, dedicated logic, programmable logic, etc.), software (such as instructions run on a processing device), or a combination thereof. In one embodiment, process 400 may be performed by ink estimation logic 220. The process 400 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-4 are not discussed or repeated here.

Process 400 begins at processing block 410, where print job data is received. In one embodiment, a job ticket (e.g., Job Definition Format (JDF)) is also received with the print job data. At processing block 420, contone images are received or generated based on the print job, and job ticket if included. At processing block 430, histograms are received or generated for each color plane based on the contone images. At processing block 440, print job settings are received. At processing block 450, the printer system settings may be received. As discussed above, the print job settings and printer system settings may be received via GUI 340, from host system 110 or any combination of the GUI 340 and host system 110.

At processing block 460, the estimated volume of ink usage is computed based on the histograms, the printer system settings and/or the print job settings. At processing block 470, the estimated ink usage data is transmitted (e.g., reported). In one embodiment, estimated ink usage is displayed via GUI 340. However in other embodiments, print controller 140 may transmit estimated ink usage data to an external computing device. At decision block 480, a determination is made as to whether one or more of the print job settings, and/or printer system settings have been changed or updated. If so, control is returned for execution of processing blocks 440-470.

The above-described mechanism enables multiple (or different) ink estimations to be provided from a single set of histograms without having to rasterize an entire print job for different printer system settings (e.g., speed, coatings, qualities, resolutions, flushing algorithms, etc.). Moreover, the ink estimation mechanism may be implemented to provide estimations for print jobs on non-accessible printing systems (e.g., one or more printers that a customer is considering for purchase or use but does not have access to) since the same histograms may be used with different printer system settings (e.g. ink deposition curves or tables). Further, the ink estimation mechanism provides an ability to determine the optimal printing conditions to minimize various parameters (e.g., ink usage and/or overall cost) with minimal compute cost.

Figure 5:
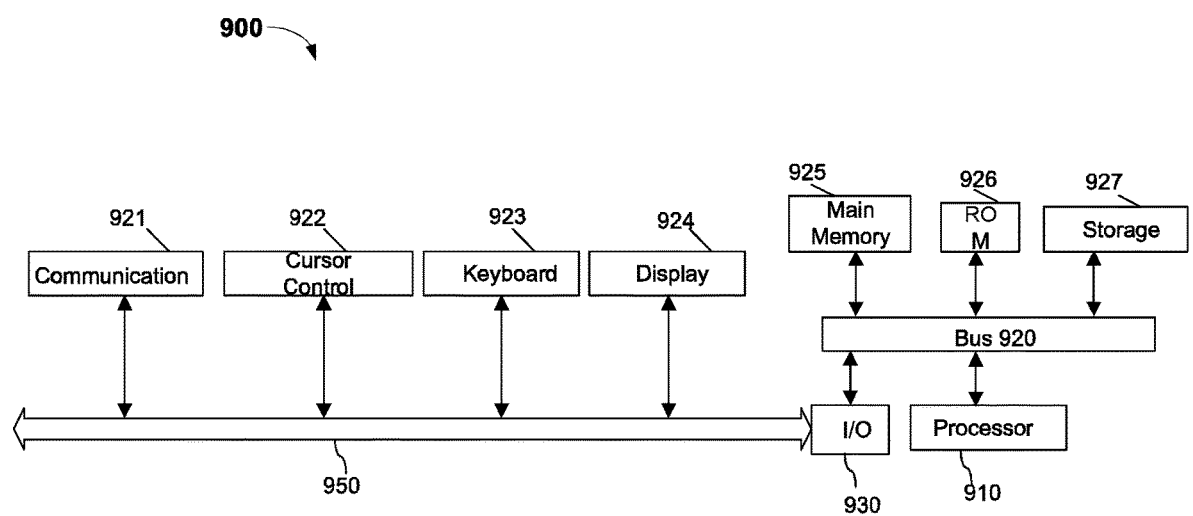
FIG. 5 illustrates one embodiment of a computer system.

FIG. 5 illustrates a computer system 900 on which printing host 110, printing system 130 and/or print controller 140 may be implemented. Computer system 900 includes a system bus 920 for communicating information, and a processor 910 coupled to bus 920 for processing information.

Computer system 900 further comprises a random access memory (RAM) or other dynamic storage device 925 (referred to herein as main memory), coupled to bus 920 for storing information and instructions to be executed by processor 910. Main memory 925 also may be used for storing temporary variables or other intermediate information during execution of instructions by processor 910. Computer system 900 also may include a read only memory (ROM) and or other static storage device 926 coupled to bus 920 for storing static information and instructions used by processor 910.

A data storage device 927 such as a magnetic disk or optical disc and its corresponding drive may also be coupled to computer system 900 for storing information and instructions. Computer system 900 can also be coupled to a second I/O bus 950 via an I/O interface 930. A plurality of I/O devices may be coupled to I/O bus 950, including a display device 924, an input device (e.g., a keyboard 923 (e.g., alphanumeric input device) and or a cursor control device 922). The communication device 921 is for accessing other computers (servers or clients). The communication device 921 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention

What is claimed is:

1. At least one non-transitory computer readable medium having instructions stored thereon, which when executed by one or more processors, cause the processors to:
receive a histogram for each of a plurality of color planes;
receive one or more printer system settings including an ink deposition curve comprising an ink volume per unit area for all gray levels for each of the plurality of color planes; and
generate estimated ink usage data for each of the plurality of color planes based on the histograms and the one or more printer system settings.

2. The computer readable medium of claim 1, wherein the one or more printer system settings further comprise one or more of print resolution, flushing type, post-processing marks, undercoat/overcoat type, ink selection, density mode, print speed and printer type.

3. The computer readable medium of claim 1, having instructions stored thereon, which when executed by the one or more processors, further cause the processors to receive one or more print job settings.

4. The computer readable medium of claim 3, wherein the estimated ink usage data is generated based on the histograms, the one or more printer system settings and the one or more print job settings.

5. The computer readable medium of claim 4, wherein at least one of the one or more printer system settings and the one or more print job settings are received via a graphical user interface.

6. The computer readable medium of claim 4, wherein the one or more print job settings are received via a job ticket.

7. The computer readable medium of claim 5, having instructions stored thereon, which when executed by the one or more processors, further cause the processors to display the estimated ink usage data at the graphical user interface.

8. The computer readable medium of claim 1, having instructions stored thereon, which when executed by the one or more processors, further cause the processors to generate a contone image corresponding to each of the plurality of color planes.

9. The computer readable medium of claim 8, having instructions stored thereon, which when executed by the one or more processors, further cause the processors to generate the histogram for each of the plurality of color planes based on the corresponding contone images.

10. The computer readable medium of claim 1, having instructions stored thereon, which when executed by the one or more processors, further cause the processors to:
determine updated printer system settings; and
generate second estimated ink usage data for each of the plurality of color planes based on the histograms and the updated printer system settings.

11. A system comprising:
at least one physical memory device to store ink estimation logic; and
one or more processors coupled with the at least one physical memory device, to execute the ink estimation logic to receive a histogram for each of a plurality of color planes, receive one or more printer system settings including an ink deposition curve comprising an ink volume per unit area for all gray levels for each of the plurality of color planes and generate estimated ink usage data for each of the plurality of color planes based on the histograms and the one or more printer system settings.

12. The system of claim 11, wherein the one or more printer system settings further comprise one or more of print resolution, flushing type, post-processing marks, undercoat/overcoat type, ink selection, density mode, print speed and printer type.

13. The system of claim 11, wherein the ink estimation logic receives one or more print job settings.

14. The system of claim 13, wherein the estimated ink usage data is generated based on the histograms, the one or more printer system settings and the one or more print job settings.

15. The system of claim 14, wherein the at least one physical memory device stores a graphical user interface, and the one or more processors execute the graphical user interface to receive at least one of the one or more printer system settings and the one or more print job settings.

16. The system of claim 14, wherein the one or more print job settings are received via a job ticket.

17. The system of claim 15, wherein the graphical user interface displays the estimated ink usage data.

18. The system of claim 11, wherein the ink estimation logic generates a contone image corresponding to each of the plurality of color planes.

19. The system of claim 18, wherein the ink estimation logic further generates the histogram for each of the plurality of color planes based on the corresponding contone images.

20. The system of claim 11, wherein the ink estimation logic further determines updated printer system settings and generates second estimated ink usage data for each of the plurality of color planes based on the histograms and the updated printer system settings.

21. The system of claim 11 further comprising a printer to print a print job using the one or more printer system settings.

* * * * *